United States Patent
LeFevre et al.

(10) Patent No.: US 11,613,116 B1
(45) Date of Patent: Mar. 28, 2023

(54) SYSTEM AND METHOD FOR PRINTING COLOR IMAGES ON SUBSTRATES IN AN INKJET PRINTER

(71) Applicant: Xerox Corporation, Norwalk, CT (US)

(72) Inventors: Jason M. LeFevre, Penfield, NY (US); Douglas K. Herrmann, Webster, NY (US); Chu-Heng Liu, Penfield, NY (US); Varun Sambhy, Pittsford, NY (US); Seemit Praharaj, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 19 days.

(21) Appl. No.: 17/491,833

(22) Filed: Oct. 1, 2021

(51) Int. Cl.
| | |
|---|---|
| B41J 29/393 | (2006.01) |
| B41J 2/045 | (2006.01) |
| G06K 15/10 | (2006.01) |
| G06K 15/16 | (2006.01) |
| G06K 15/02 | (2006.01) |

(52) U.S. Cl.
CPC ....... B41J 2/04508 (2013.01); B41J 2/04513 (2013.01); B41J 2/04536 (2013.01); G06K 15/027 (2013.01); G06K 15/102 (2013.01); G06K 15/16 (2013.01)

(58) Field of Classification Search
CPC .. B41J 2/04513; B41J 2/04536; B41J 25/001; B41J 25/006; B41J 29/393; B41J 2029/3935; B41J 2/2132; B41J 2/2135; B41J 2/2146; B41J 2/04505; G06K 15/027; G06K 15/102; G06K 15/16
See application file for complete search history.

(56) References Cited

U.S. PATENT DOCUMENTS

| | | |
|---|---|---|
| 8,005,378 B2 | 8/2011 | Sheflin et al. |
| 8,376,503 B1 | 2/2013 | Wu et al. |
| 9,044,960 B2 | 6/2015 | Mizes et al. |
| 2002/0012018 A1 | 1/2002 | Ohtsuka et al. |
| 2003/0092796 A1 | 5/2003 | Tsao et al. |
| 2004/0021732 A1 | 2/2004 | Bergen |
| 2008/0143776 A1 | 6/2008 | Konno et al. |
| 2008/0292368 A1 | 11/2008 | Baretsky et al. |
| 2009/0086231 A1 | 4/2009 | Marumoto |
| 2010/0245446 A1 | 9/2010 | Nishikori et al. |
| 2011/0080615 A1 | 4/2011 | Ono et al. |
| 2011/0181897 A1 | 7/2011 | Noguchi et al. |
| 2013/0084439 A1 | 4/2013 | Ojiro et al. |
| 2015/0138266 A1* | 5/2015 | Chen ............ B41J 3/543 347/14 |
| 2015/0138268 A1 | 5/2015 | Chen et al. |

* cited by examiner

Primary Examiner — Julian D Huffman
(74) Attorney, Agent, or Firm — Maginot Moore & Beck LLP

(57) ABSTRACT

A method of operating a printer distributes inkjet operations from frequently used inkjets to lesser used inkjets. The redistribution of the inkjet operations helps reduce the number of inkjets exhibiting cross-process direction error so printhead maintenance operations, such as purging, occur less frequently.

20 Claims, 4 Drawing Sheets

SYSTEM AND METHOD FOR PRINTING COLOR IMAGES ON SUBSTRATES IN AN INKJET PRINTER

TECHNICAL FIELD

This disclosure relates generally to devices that produce ink images on media, and more particularly, to the image quality of the images produced by such devices.

BACKGROUND

Inkjet imaging devices, also known as inkjet printers, eject liquid ink from printheads to form images on an image receiving surface. The printheads include a plurality of inkjets that are arranged in an array. Each inkjet has a thermal or piezoelectric actuator that is coupled to a printhead controller. The printhead controller generates firing signals that correspond to digital data content corresponding to images. The actuators in the printheads respond to the firing signals by expanding into an ink chamber to eject ink drops onto an image receiving surface and form an ink image that corresponds to the digital image content used to generate the firing signals. The image receiving surface is usually a continuous web of media material or a series of media sheets.

Inkjet printers used for producing color images typically include multiple printhead assemblies. Each printhead assembly includes one or more printheads that typically eject a single color of ink. In a typical inkjet color printer, four printhead assemblies are positioned in a process direction with each printhead assembly ejecting a different color of ink. The four ink colors most frequently used are cyan, magenta, yellow, and black. The common nomenclature for such printers is CMYK color printers. Some CMYK printers have two printhead assemblies that print each color of ink. The printhead assemblies that print the same color of ink are offset from each other by one-half of the distance between adjacent inkjets in the cross-process direction to double the number of pixels per inch density of a line of the color of ink ejected by the printheads in the two assemblies. As used in this document, the term "process direction" means the direction of movement of the image receiving surface as it passes the printheads in the printer and the term "cross-process direction" means a direction that is perpendicular to the process direction in the plane of the image receiving surface.

High quality prints require precise positioning of the ink drops ejected from the printheads. One issue adversely impacting image quality is streakiness. Streakiness can be caused by inkjets that eject ink drops along paths that deviate from the normal between the nozzle of the inkjet and the image receiving surface in the cross-process direction. As the ink throughput through an inkjet increases so does the likelihood increase that the inkjet exhibits cross-process direction error. Developing inkjet color printers that attenuate the likelihood that inkjets develop cross-process direction errors would be beneficial.

SUMMARY

An inkjet printer is configured to reduce the likelihood of inkjets developing cross-process direction error and the resulting streakiness. The color inkjet printer includes a plurality of printheads, a media transport configured to move media sheets past the plurality of printheads, a portion of the media transport being configured to move media sheets in a cross-process direction before the media sheets pass the plurality of printheads, an image sensor configured to generate image data of the media sheets after the media sheets pass the plurality of printheads, and a controller operatively connected to the image sensor, the actuator and the media transport. The controller is configured to receive with a controller image data content for a print job, operate printheads in the printer to print media sheets using the image data content for the print job until a media sheet printed with at least one test pattern is identified, identify a number of inkjet operations for each inkjet in the printheads to print the image data content for media sheets following the media sheet printed with the at least one test pattern until a next media sheet printed with at least one test pattern is identified, and move inkjet operations from the inkjets having more inkjet operations to inkjets having less inkjet operations during the printing of the media sheets following the media sheet printed with the at least one test pattern until the next media sheet printed with the at least one test pattern.

A method of operating a color inkjet printer to reduce the likelihood of inkjets developing cross-process direction error and the resulting streakiness. The method includes receiving with a controller image data content for a print job, operating printheads in the printer to print media sheets using the image data content for the print job until a media sheet printed with at least one test pattern is identified, identifying a number of inkjet operations for each inkjet in the printheads to print the image data content for media sheets following the media sheet printed with the at least one test pattern until a next media sheet printed with at least one test pattern is identified, and moving inkjet operations from the inkjets having more inkjet operations to inkjets having less inkjet operations during the printing of the media sheets following the media sheet printed with the at least one test pattern until the next media sheet printed with the at least one test pattern.

BRIEF DESCRIPTION OF THE DRAWINGS

The foregoing aspects and other features of a color inkjet printer and color inkjet printer operational method that reduces the likelihood of inkjets developing cross-process direction error and the resulting streakiness are explained in the following description, taken in connection with the accompanying drawings.

DETAILED DESCRIPTION

Figure 1:
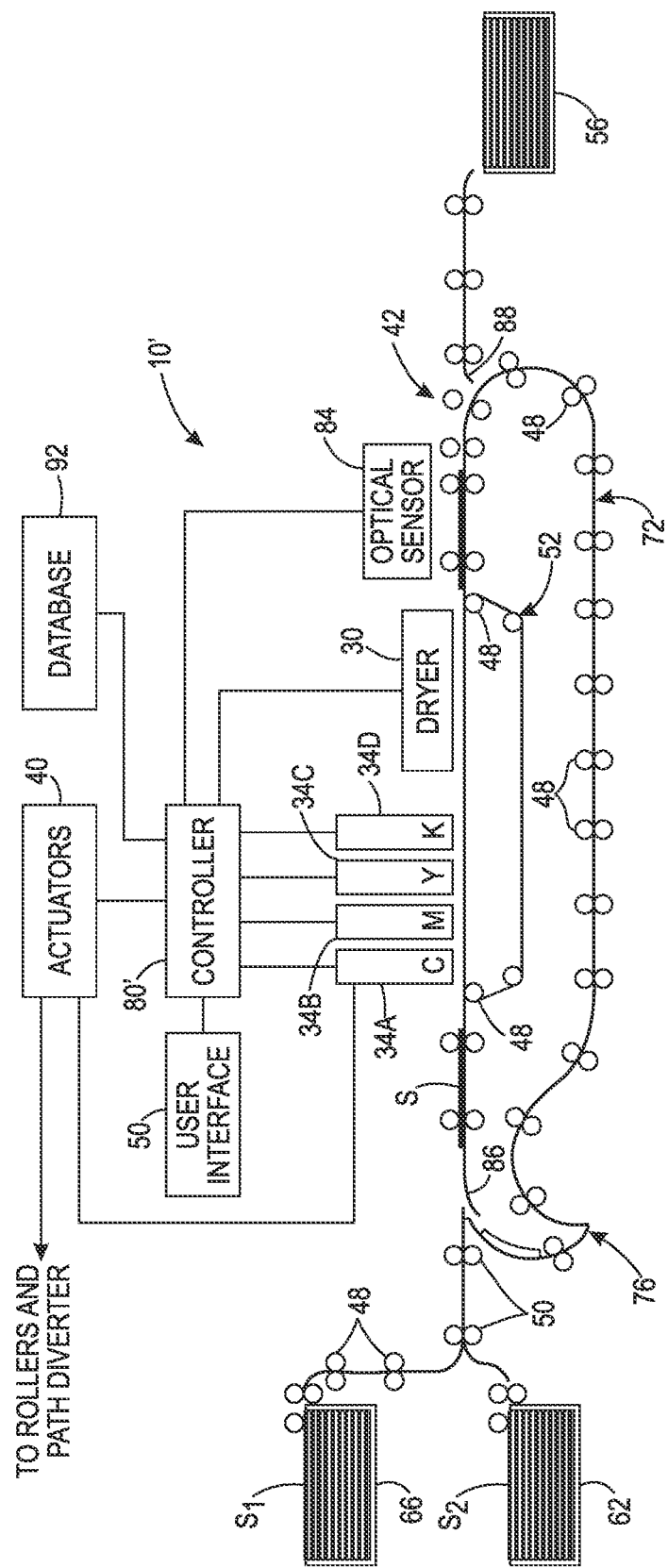
FIG. 1 is a schematic drawing of a color inkjet printer that reduces the likelihood of inkjets developing cross-process direction error and the resulting streakiness.

For a general understanding of the environment for the printer and printer operational method disclosed herein as well as the details for the printer and the printer operational method, reference is made to the drawings. In the drawings, like reference numerals have been used throughout to designate like elements. As used herein, the word "printer" encompasses any apparatus that ejects ink drops onto different types of media to form ink images.

Figure 3:
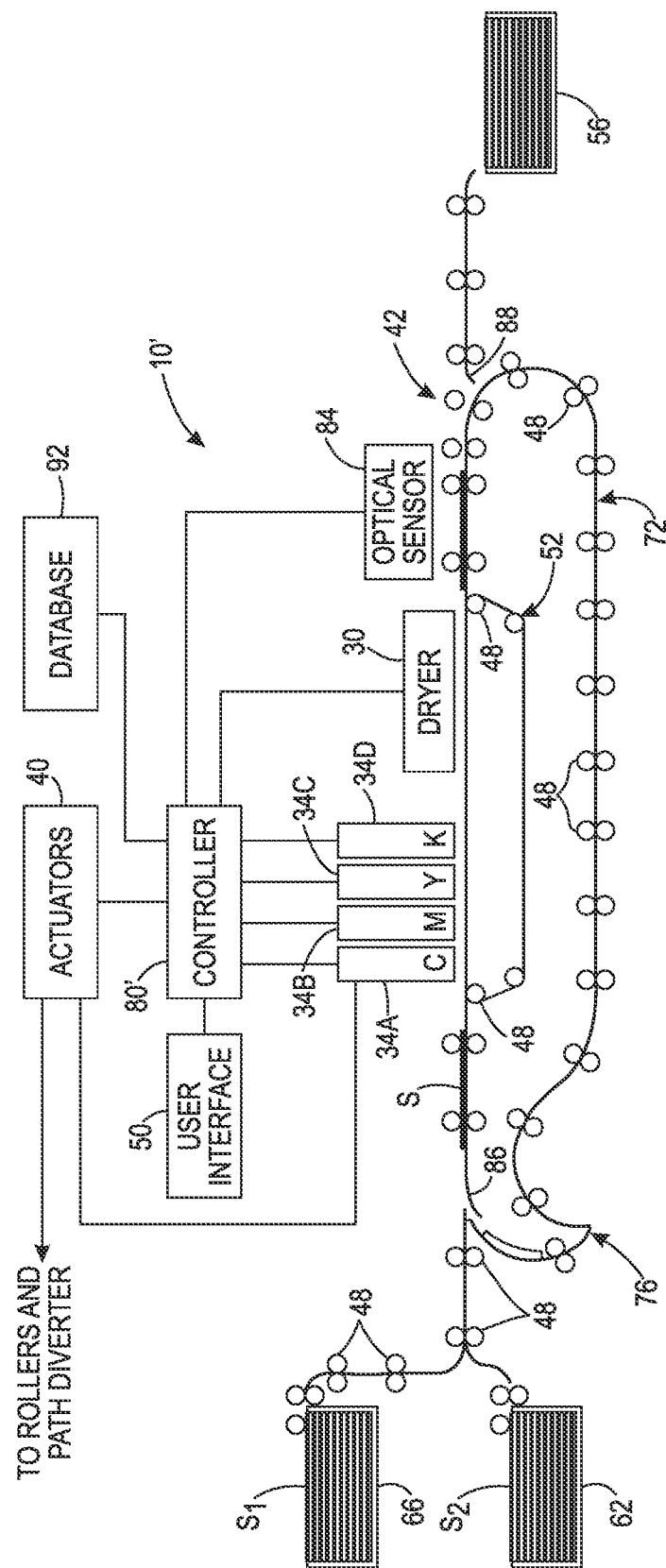
FIG. 3 is a schematic drawing of a prior art color inkjet printer that reduces the likelihood of inkjets developing cross-process direction error and the resulting streakiness.

FIG. 3 depicts a prior art high-speed color inkjet printer 10 that does not reduce the likelihood of inkjets developing cross-process direction error and the resulting streakiness. As illustrated, the printer 10 is a printer that directly forms an ink image on a surface of a media sheet stripped from one of the supplies of media sheets $S_1$ or $S_2$ and the sheets S are moved through the printer 10 by the controller 80 operating one or more of the actuators 40 that are operatively connected to rollers or to at least one driving roller of conveyor 52 that comprise a portion of the media transport 42 that passes through the print zone of the printer (shown in FIG. 4). In one embodiment, each printhead module has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads that enables media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media.

Figure 4:
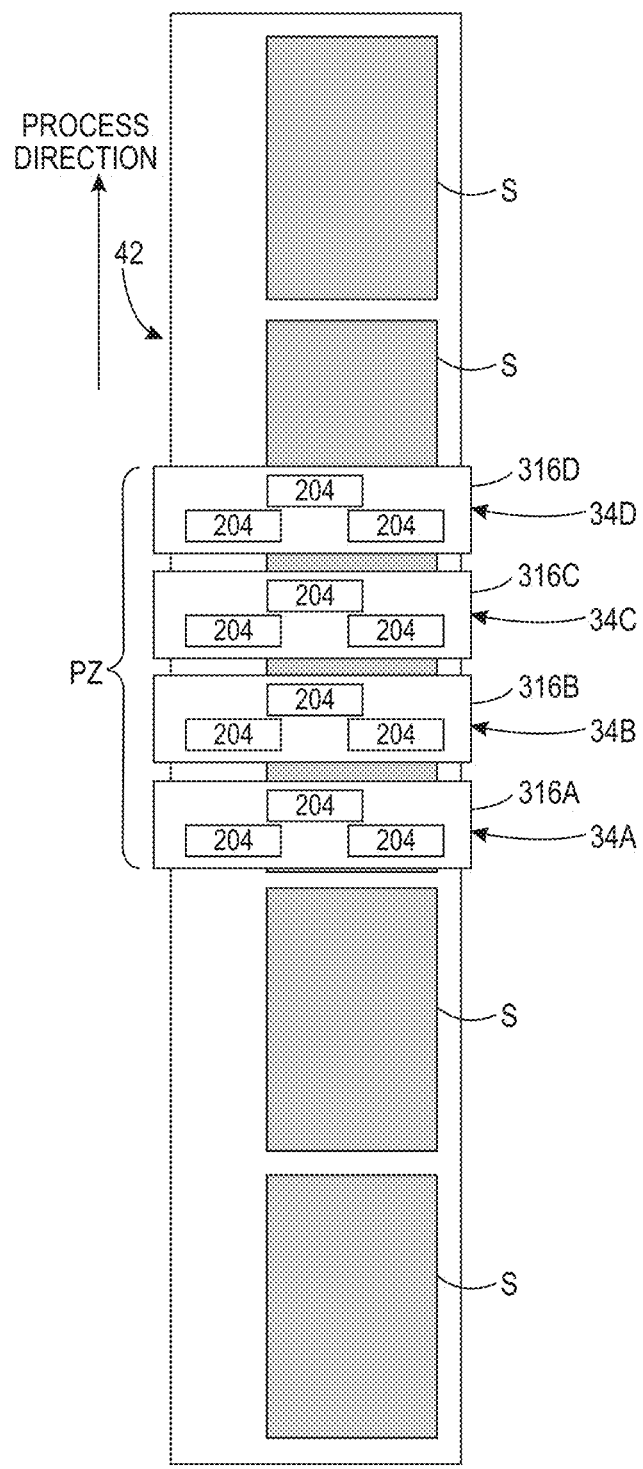
FIG. 4 depicts the print zone in the printer of FIG. 5.

The print zone PZ in the prior art printer 10 of FIG. 3 is shown in FIG. 4. The print zone PZ has a length in the process direction commensurate with the distance from the first inkjets that a sheet passes in the process direction to the last inkjets that a sheet passes in the process direction and it has a width that is the maximum distance between the most outboard inkjets on opposite sides of the print zone that are directly across from one another in the cross-process direction. Each printhead module 34A, 34B, 34C, and 34D shown in FIG. 4 has three printheads 204 mounted to a printhead carrier plate 316A, 316B, 316C, and 316D, respectively.

As shown in FIG. 3, the printed image passes under an image dryer 30 after the ink image is printed on a sheet S. The image dryer 30 can include an infrared heater, a heated air blower, air returns, or combinations of these components to heat the ink image and at least partially fix an image to the web. An infrared heater applies infrared heat to the printed image on the surface of the web to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

A duplex path 72 is provided to receive a sheet from the transport system 42 after a substrate has been printed and move it by the rotation of rollers in an opposite direction to the direction of movement past the printheads. At position 76 in the duplex path 72, the substrate can be turned over so it can merge into the job stream being carried by the media transport system 42. The controller 80 is configured to flip the sheet selectively. That is, the controller 80 can operate actuators to turn the sheet over so the reverse side of the sheet can be printed or it can operate actuators so the sheet is returned to the transport path without turning over the sheet so the printed side of the sheet can be printed again. Movement of pivoting member 88 provides access to the duplex path 72. Rotation of pivoting member 88 is controlled by controller 80 selectively operating an actuator 40 operatively connected to the pivoting member 88. When pivoting member 88 is rotated counterclockwise as shown in FIG. 3, a substrate from media transport 42 is diverted to the duplex path 72. Rotating the pivoting member 88 in the clockwise direction from the diverting position closes access to the duplex path 72 so substrates on the media transport moving to the receptacle 56. Another pivoting member 86 is positioned between position 76 in the duplex path 72 and the media transport 42. When controller 80 operates an actuator to rotate pivoting member 86 in the counterclockwise direction, a substrate from the duplex path 72 merges into the job stream on media transport 42. Rotating the pivoting member 86 in the clockwise direction closes the duplex path access to the media transport 42.

As further shown in FIG. 3, the printed media sheets S not diverted to the duplex path 72 are carried by the media transport to the sheet receptacle 56 in which they are be collected. Before the printed sheets reach the receptacle 56, they pass by an optical sensor 84. The optical sensor 84 generates image data of the printed sheets and this image data is analyzed by the controller 80. The controller 80 is configured to detect streakiness in the printed images on the media sheets of a print job. Additionally, sheets that are printed with test pattern images are inserted at intervals during the print job. These test pattern images are analyzed by the controller 80 to determine which inkjets, if any, that were operated to eject ink into the test pattern did in fact do so, and if an inkjet did eject an ink drop whether the drop had an appropriate mass and the location of the ejected drop. Any inkjet not ejecting an ink drop it was supposed to eject or ejecting a drop not having the right mass or landing at an errant position is called an inoperative inkjet in this document. The controller can store data identifying the inoperative inkjets in database 92 operatively connected to the controller. These sheets printed with the test patterns are sometimes called run-time missing inkjet (RTMJ) sheets and these sheets are discarded from the output of the print job. A user can operate the user interface 50 to obtain reports displayed on the interface that identify the number of inoperative inkjets and the printheads in which the inoperative inkjets are located. The optical sensor can be a digital camera, an array of LEDs and photodetectors, or other devices configured to generate image data of a passing surface. As already noted, the media transport also includes a duplex path that can turn a sheet over and return it to the transport prior to the printhead modules so the opposite side of the sheet can be printed. While FIG. 3 shows the printed sheets as being collected in the sheet receptacle, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operatively connected to the components of the printhead modules 34A-34D (and thus the printheads), the actuators 40, and the dryer 30. The ESS or controller 80, for example, is a self-contained computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the image data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, image content data for an image to be produced are sent to the controller 80 from either a scanning system or an online or work station connection for processing and generation of the printhead control signals output to the printhead modules 34A-34D. Along with the image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term "print job parameters" means non-image content data for a print job and the term "image content data" means digital data that identifies an ink image to be printed on a media sheet.

Using like reference numbers to identify like components, FIG. 1 depicts a high-speed color inkjet printer 10' in which some of the actuators 40 have been operatively to the rollers 50 and a controller 80' has been configured to perform the process 200 described below to reduce the likelihood of inkjets developing cross-process direction error and the resulting streakiness. The actuators 40 operatively connected to the rollers 50 are configured to move the rollers bidirectionally in the cross-process direction. These actuators can be, for example, stepper motors that precisely move the rollers in the cross-process direction by a discrete number of inkjet positions as described more fully below.

As noted previously, the image data of the media sheets generated by the optical sensor 84 are analyzed to identify inoperative inkjets that are completely failing or that eject ink drops errantly. In the printer 10', the controller 80' not only identifies which inkjets are inoperative from the RTMJ sheets but it also identifies the cross-process direction error for the inkjets ejecting ink drops that deviate from the normal between the inkjet nozzle and the image receiving surface in the cross-process direction. As used in this document, the term "cross-process direction error" means the distance in the cross-process direction between a normal inkjet nozzle and a portion of an image receiving surface directly opposite the inkjet nozzle and a position where an ink drop ejected from the inkjet nozzle lands that exceeds a predetermined cross-process error distance. In one embodiment, the error distance is the distance between adjacent inkjets in a printhead. The identification of these inkjets and the identified cross-process direction error that exceeds the predetermined error distance are stored in a database 92. The controller 80' is also configured to analyze the image content data for the sheets to be printed between the current RTMJ sheet and the next RTMJ sheet to be printed during the print job if the number of inkjets exhibiting cross-process direction error exceeds a predetermined threshold. In one embodiment, the predetermined threshold is in the range of about 2% to about 5% of the number of inkjets in a printhead when the predetermined cross-process direction error is about 20 pm. Alternatively, the printer operator can enter a percentage through the user interface 50. The reader should recognize that human perceptible streaks caused by cross-process direction error depends on the ink, the size of the ink drops, the resolution of the inkjets, the type of media being printed, the image content, and the like so these values are exemplary only. For each inkjet, the controller 80' identifies how many times the inkjet is operated for that portion of the print job. As used in this document, the term "inkjet operation" refers to operating the inkjet to eject a drop of ink. The controller moves inkjet operations from the inkjets having more inkjet operations to print that portion of the print job to inkjets having fewer inkjet operations to print that portion of the print job. This redistribution of inkjet operations is achieved by identifying sheets in the next portion of the print job between RTMJ sheets that are to be shifted in the cross-process direction before being printed. The controller uses the stored identification of inkjets having a cross-process direction error that exceeds the predetermined error distance to eliminate inkjets for the shifting of inkjet operations from the more frequently used inkjets. During the printing of these sheets, the controller 80' operates the actuators 40 operatively connected to the rollers 50 to move the identified sheet in the cross-process direction and also shift the image content data used to generate the firing signals for the inkjets to comport with the physical shifting of the sheets. These actuators are operated to move the sheets in both the inboard and outboard directions to distribute the operational load on more frequently used inkjets to the inkjets on either side of the inkjets in the cross-process direction. In one embodiment, the maximum distance that a sheet can be moved is 3 mm. This limitation ensures that the sheet is not moved a distance that would cause the edge of the sheet to strike components on the edge of the print zone. This redistribution of the inkjet operational load occurs with the analysis of each RTMJ sheet of a print job. By reducing the number of ejection cycles for some of the more frequently used inkjets, the appearance of cross-process direction error is delayed beyond the time it would occur if the print job was performed without the shifting. As a consequence, fewer inkjets exhibit cross-process direction error ejections and streakiness is reduced. Additionally, fewer inkjets become inoperative over a longer period of time so printhead maintenance, particularly purging, occurs less frequently. Avoidance of purging is especially advantageous because that process uses ink for a purpose other than image printing. Accumulations of such unproductive ink loss can affect the economic efficiency of a printer.

Figure 2:
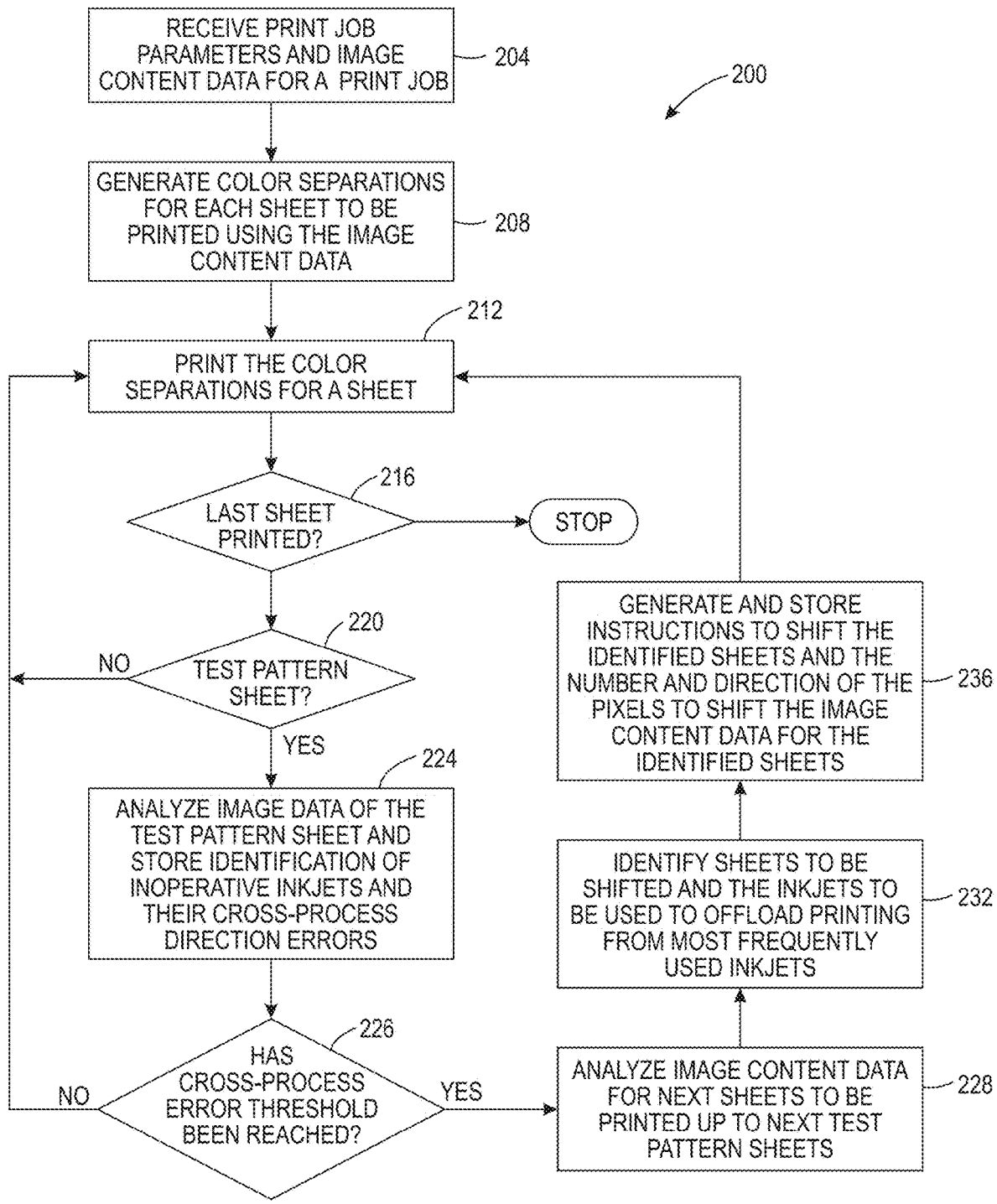
FIG. 2 is a flow diagram of a process for operating the printer of FIG. 1 to reduce the likelihood of inkjets developing cross-process direction error and the resulting streakiness.

FIG. 2 depicts a flow diagram for a process 200 that operates the printer 10' to shift media sheets and image content data to reduce the likelihood of cross-process direction error occurring in the inkjets of the printer. In the discussion below, a reference to the process 200 performing a function or action refers to the operation of a controller, such as controller 80', to execute stored program instructions to perform the function or action in association with other components in the printer. The process 200 is described as being performed with the printer 10' of FIG. 1 for illustrative purposes.

The process 200 of operating the printer 10' begins with the controller receiving the job parameters and the image data content for a print job (block 210). The image content data for each sheet is divided into a color separation for each printhead module (block 214). The process prints each color separation on a media sheet as the sheet passes the printhead modules (block 218). The media sheets are printed using image content data until the controller detects that the last sheet has been printed (block 242) or it detects a media sheet that has been printed with one or more test patterns (block 222). The controller 80' analyzes the image data of the printed test patterns to identify inoperative inkjets and to measure and store the cross-process direction error for those inkjets exceeding a predetermined error distance (block 226). The process determines if the cross-process direction error threshold has been reached (block 228). If it has not been reached, the process continues printing color separations for sheets until the threshold is reached. The process then analyzes the image content data to be printed for the following sheets until the next test pattern sheet is encountered to identify the inkjets that are used most frequently in the printing of the sheets until the next test pattern sheet (block 230). The controller determines which sheets are to be shifted and which inkjets in the cross-process direction near these most frequently used inkjets can be used to perform at least some of the printing for these inkjets (block 234). This determination includes use of the measured cross-process direction error to identify the inkjets to which some of the printing load is shifted. The controller 80' stores instructions to operate the actuators 40 operatively connected to the rollers 50 to move the selected sheets as they encounter the rollers 50 and shifts the image content data for those sheets a corresponding amount so the firing signals for the selected inkjets are appropriately generated (block 238). The sheets are then printed until the next test pattern sheet is detected (block 222). Once the last sheet is printed (block 242), the process is finished.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method for operating a printer comprising:
   receiving with a controller image data content for a print job;
   operating printheads in the printer to print media sheets using the image data content for the print job until a media sheet printed with at least one test pattern is identified;
   identifying a number of inkjet operations for each inkjet in the printheads to print the image data content for media sheets following the media sheet printed with the at least one test pattern until a next media sheet printed with at least one test pattern is identified; and
   moving inkjet operations from the inkjets having more inkjet operations to inkjets having less inkjet operations during the printing of the media sheets following the media sheet printed with the at least one test pattern until the next media sheet printed with the at least one test pattern.

2. The method of claim 1, the moving of the inkjet operations further comprising:
   identifying at least one of the media sheets following the media sheet printed with the at least one test pattern for cross-process direction movement and a distance of movement in the cross-process direction that moves inkjet operations from one of the inkjets identified to have more inkjet operations to one of the inkjets identified as having fewer inkjet operations for the printing of the media sheets following the media sheet printed with the at least one test pattern; and
   moving the image content data and the media sheets identified for cross-process direction movement by the identified distance prior to printing the media sheets identified for cross-process direction movement.

3. The method of claim 2 further comprising:
   identifying whether each inkjet in the printheads has a cross-process direction error; and
   using the identified cross-process direction errors to identify the inkjets to which inkjet operations are moved.

4. The method of claim 3, the identification of the inkjets having a cross-process direction error further comprising:
   comparing the cross-process direction error to a cross-process direction error distance; and
   storing in a memory the identification of the inkjets having a cross-process direction error with the identified cross-process direction errors for the inkjets having a cross-process direction error greater than the cross-process direction error distance.

5. The method of claim 4 further comprising:
   identifying a direction of movement in the cross-process direction.

6. The method of claim 5, the movement of the media sheets in the cross-process direction further comprising:
   operating an actuator to move a roller engaging one of the media sheets identified for cross-process direction movement prior to the media sheet identified for cross-process direction movement entering a print zone opposite the printheads in the printer.

7. The method of claim 6 further comprising:
   limiting movement of the roller to a predetermined maximum distance.

8. The method of claim 7 wherein the operation of the actuator is operation of a stepper motor.

9. The method of claim 8 further comprising:
   identifying a number of inkjet operations for each inkjet in the printheads to print the image data content for media sheets between each media sheet printed with the at least one test pattern; and
   moving inkjet operations from the inkjets having more inkjet operations to inkjets having less inkjet operations during the printing of the media sheets following each media sheet printed with the at least one test pattern.

10. The method of claim 9 wherein the identification of the number of inkjet operations for each inkjet in the printheads and the moving of inkjet operations from the inkjets having more inkjet operations to inkjets having less inkjet operations only occurs after a predetermined percentage of inkjets in a printhead have a cross-process direction error stored in the memory.

11. An inkjet printer comprising:
    a plurality of printheads;
    a media transport configured to move media sheets past the plurality of printheads, a portion of the media transport being configured to move media sheets in a cross-process direction before the media sheets pass the plurality of printheads;

an image sensor configured to generate image data of the media sheets after the media sheets pass the plurality of printheads; and a controller operatively connected to the image sensor, the actuator and the media transport, the controller being configured to:

receive with a controller image data content for a print job;

operate printheads in the printer to print media sheets using the image data content for the print job until a media sheet printed with at least one test pattern is identified;

identify a number of inkjet operations for each inkjet in the printheads to print the image data content for media sheets following the media sheet printed with the at least one test pattern until a next media sheet printed with at least one test pattern is identified; and move inkjet operations from the inkjets having more inkjet operations to inkjets having less inkjet operations during the printing of the media sheets following the media sheet printed with the at least one test pattern until the next media sheet printed with the at least one test pattern.

12. The inkjet printer of claim 11, controller being further configured to:

identify at least one of the media sheets following the media sheet printed with the at least one test pattern for cross-process direction movement and a distance of movement in the cross-process direction that moves inkjet operations from one of the inkjets identified to have more inkjet operations to one of the inkjets identified as having fewer inkjet operations for the printing of the media sheets following the media sheet printed with the at least one test pattern; and move the image content data and the media sheets identified for cross-process direction movement by the identified distance prior to printing the media sheets identified for cross-process direction movement.

13. The inkjet printer of claim 12, the controller being further configured to:

identify whether each inkjet in the printheads has a cross-process direction error; and use the identified cross-process direction errors to identify the inkjets to which inkjet operations are moved.

14. The inkjet printer of claim 13, the controller being further configured to:

compare the cross-process direction error to a cross-process direction error distance; and store in a memory the identification of the inkjets having a cross-process direction error with the identified cross-process direction errors for the inkjets having a cross-process direction error greater than the cross-process direction error distance.

15. The inkjet printer of claim 14, the controller being further configured to:

identify a direction of movement in the cross-process direction.

16. The inkjet printer of claim 15, the controller being further configured to:

operate an actuator to move a roller engaging one of the media sheets identified for cross-process direction movement prior to the media sheet identified for cross-process direction movement entering a print zone opposite the printheads in the printer.

17. The inkjet printer of claim 16, the controller being further configured to:

limit movement of the roller to a predetermined maximum distance.

18. The inkjet printer of claim 17 wherein the actuator is a stepper motor.

19. The inkjet printer of claim 18, the controller being further configured to:

identify a number of inkjet operations for each inkjet in the printheads to print the image data content for media sheets between each media sheet printed with the at least one test pattern; and move inkjet operations from the inkjets having more inkjet operations to inkjets having less inkjet operations during the printing of the media sheets following each media sheet printed with the at least one test pattern.

20. The inkjet printer of claim 19, the controller being further configured to:

identify the number of inkjet operations for each inkjet in the printheads and move inkjet operations from the inkjets having more inkjet operations to inkjets having less inkjet operations only after a predetermined percentage of inkjets in a printhead have a cross-process direction error stored in the memory.

* * * * *